US010057598B2

(12) United States Patent
Jung et al.

(10) Patent No.: US 10,057,598 B2
(45) Date of Patent: Aug. 21, 2018

(54) METHOD, DEVICE, AND COMPUTER READABLE MEDIUM FOR ENCODING AND DECODING OF THREE DIMENSIONAL VIDEO OF A CURRENT BLOCK OF FIXED IMAGES INVOLVING CODING A CURRENT BLOCK AS A FUNCTION OF CODING INFORMATION AND CODING PROCESS USING SELECTIVE INHERITANCE

(71) Applicant: Orange, Paris (FR)

(72) Inventors: Joel Jung, Le Mesnil-Saint-Denis (FR); Elie Mora, Paris (FR)

(73) Assignee: ORANGE, Paris (FR)

( * ) Notice: Subject to any disclaimer, the term of this patent is extended or adjusted under 35 U.S.C. 154(b) by 85 days.

(21) Appl. No.: 14/375,371

(22) PCT Filed: Jan. 25, 2013

(86) PCT No.: PCT/FR2013/050160
§ 371 (c)(1),
(2) Date: Jul. 29, 2014

(87) PCT Pub. No.: WO2013/114028
PCT Pub. Date: Aug. 8, 2013

(65) Prior Publication Data
US 2015/0043635 A1 Feb. 12, 2015

(30) Foreign Application Priority Data
Jan. 30, 2012 (FR) ...................................... 12 50866

(51) Int. Cl.
*H04N 19/44* (2014.01)
*H04N 19/51* (2014.01)
(Continued)

(52) U.S. Cl.
CPC ......... *H04N 19/597* (2014.11); *H04N 19/103* (2014.11); *H04N 19/157* (2014.11);
(Continued)

(58) Field of Classification Search
CPC ..................................................... H04N 19/597
(Continued)

(56) References Cited

U.S. PATENT DOCUMENTS

2007/0189392 A1* 8/2007 Tourapis .............. H04N 19/176
375/240.21
2012/0281768 A1* 11/2012 Matsuba ................ H04N 19/91
375/240.24
(Continued)

OTHER PUBLICATIONS

Schwarz et al., Description of 3D Video Technology Proposal by Fraunhofer HHI (HEVC compatible; configuration A), Nov. 2011, ISO/IEC JTC1/SC29/WG11 MPREG2011/M22570.*
(Continued)

Primary Examiner — William C Vaughn, Jr.
Assistant Examiner — Joseph A Towe
(74) Attorney, Agent, or Firm — David D. Brush; Westman, Champlin & Koehler, P.A.

(57) ABSTRACT

A method is provided for decoding at least one current encoded block of a first image relative to a reference block of a second image including at least one common element with the first image, wherein the reference block has been previously decoded. The method includes: filtering the decoded reference block; estimating, only on the basis of the filtered decoded reference block, at least one value of a local characteristic of the filtered decoded reference block; determining, on the basis of the estimated value of the local characteristic: a set of decoding information to be used for decoding the current block, a method for decoding the current block, on the basis of the estimated value of the local characteristic, decoding the current block on the basis of the
(Continued)

set of determined decoding information and according to the determined decoding method.

19 Claims, 6 Drawing Sheets

(51) Int. Cl.
    *H04N 19/52* (2014.01)
    *H04N 19/103* (2014.01)
    *H04N 19/157* (2014.01)
    *H04N 19/597* (2014.01)
    *H04N 19/196* (2014.01)

(52) U.S. Cl.
    CPC ........... *H04N 19/197* (2014.11); *H04N 19/44* (2014.11); *H04N 19/51* (2014.11); *H04N 19/52* (2014.11)

(58) Field of Classification Search
    USPC .................................................. 375/240.12
    See application file for complete search history.

(56) References Cited

U.S. PATENT DOCUMENTS

| | | | |
|---|---|---|---|
| 2013/0188719 A1* | 7/2013 | Chen ................ | H04N 19/00684 375/240.16 |
| 2013/0202039 A1* | 8/2013 | Song ................. | H04N 19/0069 375/240.15 |

OTHER PUBLICATIONS

Schwarz et al., Description of 3D Video Technology Proposal by Fraunhofer HHI (HEVC compatible; configuration A), Nov. 2011, ISO/IEC JCT1/SC29/WG11 MPREG2011/M22570.*

International Search Report and Written Opinion dated Mar. 13, 2013 for corresponding International Application No. PCT/FR2013/050160, filed Jan. 25, 2013.

Schwarz et al., "Description of 3D Video Coding Technology Proposal by Fraunhofer HHI (HEVC Compatible Configuration A)" 98. MPEG Meeting; Nov. 28, 2011-Dec. 2, 2011; Geneva; (Motion Picture Expert Group or ISO/IEC JTC1/SC29/WG11),, No. M22570, Nov. 22, 2011 (Nov. 22, 2011), XP030051133.

Schwarz et al., "Description of 3D Video Coding Technology Proposal by Fraunhofer HHI (HEVC Compatible Configuration B)" 98. MPEG Meeting; Nov. 28, 2011-Dec. 2, 2011; Geneva; (Motion Picture Expert Group or ISO/IEC JTC1/SC29/WG11),, No. m22571, Nov. 22, 2011 (Nov. 22, 2011), XP030051134.

Bang et al., "Description of 3D Video Coding Technology Proposal by ETRI and Kwangwoon University", 98. MPEG Meeting; Nov. 28, 2011-Dec. 2, 2011; Geneva; (Motion Picture Expert Group or ISO/IEC JTC1/SC29/WG11),, No. m22625, Nov. 27, 2011 (Nov. 27, 2011), XP030051188.

English translation of the Written Opinion dated Jul. 30, 2014 for corresponding International Application No. PCT/FR2013/050160, filed Jan. 25, 2013.

* cited by examiner

METHOD, DEVICE, AND COMPUTER READABLE MEDIUM FOR ENCODING AND DECODING OF THREE DIMENSIONAL VIDEO OF A CURRENT BLOCK OF FIXED IMAGES INVOLVING CODING A CURRENT BLOCK AS A FUNCTION OF CODING INFORMATION AND CODING PROCESS USING SELECTIVE INHERITANCE

CROSS-REFERENCE TO RELATED APPLICATIONS

This Application is a Section 371 National Stage Application of International Application No. PCT/FR2013/050160, filed Jan. 25, 2013, which is incorporated herein by reference in its entirety and published as WO 2013/114028 on Aug. 8, 2013, not in English.

FIELD OF THE DISCLOSURE

The present invention relates to the field of signal encoding and decoding, and in particular the encoding/decoding of video signals.

It relates in particular, but not exclusively, to 3D video applications that encode/decode images from different cameras. The present application similarly applies to the encoding/decoding of still images.

BACKGROUND OF THE DISCLOSURE

A 3D representation of a video can be obtained by multiplexing two views (stereo format) of the same scene, recorded by two different cameras of a single stereoscopic device.

Two types of coding, MFC and MVC (for "Multiview Frame-compatible Coding" and "Multiview Video Coding") are typically used to encode images from two different views by exploiting redundancies between the two views.

Although today's market is dominated by the stereo coding format, the development of new 3D video services such as 3DTV (for "3D Television") or FTV (for "Free-viewpoint Television") require a fluid depiction of three-dimensional scenes, which can be obtained by simultaneously multiplexing more than two views of a 3D device. For this purpose, at least three videos from different points of view can be captured, encoded, and transmitted in MVV (for "MultiView Video") format, and MVC coding can be used to encode these videos. However, the cost associated with MVC coding is high, especially when the number of viewpoints is high.

A new video coding format, called MVD (for "MultiView+Depth"), is currently being developed. In this format, depth cameras are used in addition to texture (color) cameras. Each texture video is associated with a depth video. After coding and transmission, the reconstructed texture and depth videos can be sent to a synthesizer which generates the required number of intermediate views. The advantage associated with depth images from depth videos is that they are only composed of a luminance channel and that they primarily consist of smooth regions separated by edges. Thus, they are less costly to encode than texture images issuing from texture videos. In addition, inter-view correlations (between two texture images, or between two depth images) as well as inter-component correlations (between a texture image and a depth image) can be utilized by the MVD format to improve coding efficiency, for example using a 3DVC ("3D Video Coding") codec.

To improve coding efficiency, the standards include a prediction of coding information for a current block, based on coding information for blocks previously encoded and then decoded.

Such coding information can be, for example, a motion vector. Thus, the AMVP (for "Advanced Motion Vector Prediction") standard introduces a list of predictors for the motion vector of the current block. Only the difference between the motion vector of the current block being coded and the best predictor (according to a rate-distortion criterion), and an index indicating the best predictor determined from among the list of predictors, are sent to the decoder, thereby reducing the cost of transmitting information related to the motion vector of the current block. Prediction is also used to reduce the cost of transmitting information relating to an Intra coding mode. Intra coding consists of coding a block of an image based on one or more encoded then decoded blocks from this same image. Several Intra modes are defined for this purpose, each Intra mode generally corresponding to a prediction direction. Some Intra modes also consist of mean calculations performed on blocks neighboring the current block. These Intra modes are well known to those skilled in the art are not described in detail herein.

Thus, on the basis of the Intra coding, the "Most Probable Mode" or MPM is deduced for a block of an image, from the Intra modes of neighboring blocks of the same image. The MPM is then used as a predictor for coding the Intra mode selected for coding the current block.

Inheritance of information is also used to improve coding efficiency. In HEVC coding ("High Efficiency Video Coding"), a "Merge" mode allows the current block to directly inherit the motion vector and the index of the reference image for a neighboring block or for a corresponding block in a previous image (previous in the temporal sense). The inherited motion vector then does not need to be encoded, as the same principle can be applied during decoding. However, use of the Merge mode depends on a chosen rate-distortion of the coder and this therefore requires signaling, in order to inform the decoder that Merge mode was used for encoding. Such signaling is implemented by means of a "Merge" flag in the data sent to the decoder.

While the residual data between the current block and the block predicted using the inherited motion vector is determined and transmitted in "Merge" mode, in the "Skip" mode this residual data is not transmitted: the samples reconstructed in the decoder are themselves inherited from the block pointed to by the motion vector. "Skip" mode thus eliminates coding the residual data, but its use must still be signaled to the decoder.

In response to the requirements of the MPEG standard for 3D video coding (3DV), techniques employing both prediction and direct inheritance have been proposed.

The document "Description of 3D Video Coding Technology Proposal by Fraunhofer HHI (HEVC compatible configuration A)", H. Schwarz et al, m22570, November 2011, proposes systematically adding an additional predictor to the list of predictors of the AMVP standard. The additional predictor is the motion vector of the block corresponding to the current block in an adjacent view (inter-view prediction). An inter-view prediction of residual data has also been introduced, in which the residual data of the block corresponding to the current block in the adjacent view is used to predict the residual data of the current block.

In addition, the document "Description of 3D video coding technology proposal by ETRI and Kwangwoon University", G. Bang et al, m22625, in November 2011, introduced an additional prediction tool where the Intra mode chosen for a reference block in a texture image corresponding to a current block to be coded in the associated depth image (inter-component prediction) is added to a predetermined list of predictors in order to select the MPM for the current block to be coded in Intra mode in the depth image. In other words, the current block coded in this manner indirectly inherits the Intra mode chosen for the reference block.

Indirect inheritance was used in the document "Description of 3D Video Coding Technology Proposal by Fraunhofer HHI (HEVC compatible, configuration A)", H. Schwarz et al, which introduced a motion parameter inheritance tool in which the entire partitioning structure and the motion vectors used, for a block of the texture image corresponding to the current block of the depth image, is used for the current block of the depth image. However, the inheritance must also be signalled to the decoder, to enable decoding the transmitted data.

Thus, regardless of the standard and type of coding used, the implementation of inheritance is determined by evaluating the rate-distortion constraints. Therefore, the selected coding mode using inheritance, when inheritance is used to code the current block, must be signaled to the decoder so that the decoder knows the choices that were made during coding.

A need therefore exists to improve the effectiveness of the techniques for encoding/decoding signals using inheritance of encoding/decoding information.

SUMMARY

A first aspect of the invention concerns a method for encoding at least one current block of a first image relative to a reference block of a second image comprising at least one element in common with the first image, the reference block having previously been encoded then decoded.

The method comprises the steps consisting of:
filtering said decoded reference block,
estimating, solely on the basis of the filtered decoded reference block, at least one value of a local characteristic of the filtered decoded reference block,
determining, on the basis of the estimated value of the local characteristic:
  a set of encoding information to be used for encoding the current block,
  a method for encoding the current block,
on the basis of the estimated value of the local characteristic, encoding the current block on the basis of the determined set of encoding information and according to the determined encoding method.

A second aspect of the invention concerns a method for decoding at least one encoded current block of a first image relative to a reference block of a second image comprising at least one element in common with the first image, the reference block having been previously decoded.

The method comprises the steps consisting of:
filtering said decoded reference block,
estimating, solely on the basis of the filtered decoded reference block, at least one value of a local characteristic of the filtered decoded reference block;
determining, on the basis of the estimated value of the local characteristic:
  a set of decoding information to be used for decoding the current block,
  a method for decoding the current block,
on the basis of the estimated value of the local characteristic, decoding the current block on the basis of the determined set of decoding information and according to the determined decoding method.

The present invention thus advantageously allows encoding/decoding a current block by inheritance of encoding/decoding information determined after an analysis of only the local characteristics of a filtered decoded reference block. In general, "local characteristic" is understood to mean any information relating to the nature of the pixels of the reference block as obtained after filtering said reference block. Such local characteristics include, for example:
  a primary direction in the filtered decoded reference block, a primary angle or a primary orientation of the filtered decoded reference block, and/or
  an amplitude/strength of the primary direction, and/or
  mean intensity information for the filtered decoded reference block, and/or
  average chrominance or luminance information for the filtered decoded reference block, and/or
  mean distortion information for the decoded filtered reference block,
  etc.

Given that the first and second images contain a common element, such as the same scene is depicted in both the first and second images, estimating the value of a local characteristic in the filtered decoded reference block advantageously allows deducing the level of correlation (high or low) between the second image and the first image.

Thus, the high or low reliability of the inherited encoding/decoding information is determined by whether the value of a local characteristic of the filtered decoded reference block is high or low. Because said local characteristic is calculated only from a filtered decoded reference block, it can also be calculated independently during decoding, and the decoding therefore does not require receiving signaling bits to indicate the type and value of the local characteristic.

The filtering applied to the decoded reference block can, for example, be used to detect the edges present in the decoded reference block. In this case, the value of the local characteristic is then representative of the amplitude and/or direction of such edges.

According to some embodiments, the encoding or decoding of the current block, respectively according to the determined encoding or decoding method, is:
  direct, where the encoding or decoding information of the determined set is used as is to predict the current block,
  indirect, where during encoding, the encoding information of the determined set competes with predetermined encoding information on the basis of a coding performance criterion, to select the optimal encoding information to be used to predict the current block, and where during decoding, the optimal encoding information is read so as to select the corresponding decoding information in the determined set of decoding information in order to predict the current block.

Thus, the invention allows implementing a method for encoding/decoding by direct or indirect inheritance depending on the estimated value of a local characteristic of a filtered decoded reference block.

The direct inheritance method allows directly using encoding information (respectively decoding information) of the reference image to encode (respectively decode) the current block. The reliability associated with the encoding (respectively decoding) of the current block is high, as the estimated value of the local characteristic of the filtered decoded reference block is high. Furthermore, when encoding, it is not necessary to signal the coding information of the determined set for the decoding. The cost of the transmission between the encoder and decoder is thus reduced.

When the estimated value of the local characteristic of the filtered decoded reference block is lower, the indirect inheritance method still allows inheriting the encoding information (respectively decoding) for the determined set used while encoding (respectively decoding) the current block. When encoding, the encoding information for the determined set forms at least one new predictor which can then compete with predetermined predictors in order to select an optimal predictor. The optimal predictor is then sent to the decoder. When a new predictor is found to be relevant, it can then replace a predictor in a list of predetermined predictors.

According to some embodiments, during encoding and decoding, a first threshold and a second threshold are predetermined, the first threshold being greater than the second threshold, and:
- if the estimated value of the local characteristic is higher than the first threshold, the method for direct encoding and decoding is used;
- if the estimated value of the local characteristic is between the first threshold and the second threshold, the method for indirect encoding and decoding is used;
- otherwise, a method for encoding and decoding other than the direct and indirect methods is used.

These embodiments thus prevent, when the estimated value of the local characteristic of the filtered decoded reference block is low (below the second threshold), replacing a predictor in a list of predictors with the new predictor which is irrelevant in that case. It should be noted that the invention is not limited to the use of two thresholds. Additional thresholds may be provided for comparison with the estimated value of the local characteristic.

According to some embodiments, during encoding, the encoding information includes at least one encoding mode, or at least one encoding parameter associated with the encoding mode, or both, and during decoding, the decoding information includes at least one decoding mode, or at least one decoding parameter associated with the decoding mode, or both.

"Encoding/decoding mode" is understood to mean an Intra encoding/decoding mode, an Inter encoding/decoding mode, a Skip encoding/decoding mode, the form of partitioning of a macroblock, the type of transform (for example a DCT4×4 or DCT8×8 transform), motion information such as a motion vector or the precision of the resolution of a motion vector, etc. "Parameter associated with an encoding/decoding mode" is understood to mean any information serving as a parameter intrinsic to a coding mode (for example the values of deblocking filters or of activation or deactivation thresholds for encoding/decoding tools, etc.).

As a variant, during encoding and decoding, of images initially captured by a plurality of image acquisition devices, each image representing a given view, the first image corresponds to a view adjacent to the second image, and the current block and the reference block have identical positions in the first image and the second image when the position of the current block is corrected by a disparity vector between the view of the first image and the view of the second image.

These embodiments improve encoding/decoding efficiency in the case of inter-view encoding and decoding.

According to another variant, during encoding and decoding of temporally successive images captured by an image acquisition device, the first image corresponds to an image captured after the capture of the second image, and the current block and reference block represent a common scene in the first and second images respectively.

These embodiments improve the encoding and decoding efficiency in the case of Inter mode encoding and decoding.

In yet another variant, during encoding and decoding of texture images captured in association with depth images, the first image is a depth image and the second image is the texture image associated with the first image, and the current block and reference block have identical positions in the first image and second image respectively.

These embodiments improve the encoding and decoding efficiency in the case of view plus depth encoding and decoding, for example in the MVD format.

A third aspect of the invention relates to a computer program comprising instructions for implementing the method according to the first aspect of the invention or according to the second aspect of the invention, when this program is executed by a processor.

A fourth aspect of the invention relates to an encoder for encoding at least one current block of a first image relative to a reference block of a second image comprising at least one element in common with the first image, the reference block having been previously encoded and then decoded.

The encoder comprises:
- a unit for filtering the decoded reference block;
- a unit for estimating, solely on the basis of the filtered decoded reference block, at least one value of a local characteristic of the filtered decoded reference block;
- a unit for determining, on the basis of the estimated value of a local characteristic:
  - a set of encoding information to be used for encoding the current block,
  - a method for encoding the current block; and
- an encoding unit which, on the basis of the estimated value of the local characteristic, encodes the current block on the basis of the determined set of encoding information and according to the determined encoding method.

A fifth aspect of the invention relates to a decoder for decoding at least one encoded current block of a first image relative to a reference block of a second image comprising at least one element in common with the first image, the reference block having been previously decoded.

The decoder comprises:
- a unit for filtering the decoded reference block;
- a unit for estimating, solely on the basis of the filtered decoded reference block, at least one value of a local characteristic of the filtered decoded reference block;
- a unit for determining, on the basis of the estimated value of the local characteristic:
  - a set of decoding information to be used for decoding the current block,
  - a method for decoding the current block; and
- a decoding unit which, on the basis of the estimated value of the local characteristic, decodes the current block on the basis of the determined set of decoding information and according to the determined decoding method.

A sixth aspect of the invention relates to a system comprising an encoder according to the fourth aspect of the invention and a decoder according to the fifth aspect of the invention, the encoder further comprising a transmission unit for transmitting encoded blocks to the encoder for block-based image coding.

BRIEF DESCRIPTION OF THE DRAWINGS

Other features and advantages of the invention will be apparent from the following detailed description, and from the accompanying drawings in which.

DETAILED DESCRIPTION OF ILLUSTRATIVE EMBODIMENTS

Figure 1:
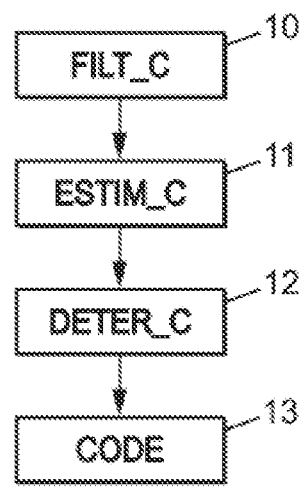
FIG. 1 is a diagram representing the main steps of an encoding method according to the invention.

FIG. 1 is a diagram representing the main steps of an encoding method according to the invention.

The encoding method according to the invention is applied to a current block of a first image relative to a reference block of a second image comprising at least one element in common with the first image. "Reference block" is understood to mean a block that has been previously encoded and then decoded. Such a decoded reference block is used for coding the current block.

In step 10, the decoded reference block is filtered.

Such a step is performed for example using an edge detection filter to detect edges in said decoded reference block. Such a filter may be a Sobel filter, a Canny filter, or some other edge detection filter.

In step 11, at least one value of a local characteristic of the filtered decoded reference block is estimated by calculation solely on the basis of the decoded reference block.

Such a local characteristic is for example:
- a primary direction in the filtered decoded reference block, a primary angle or a primary orientation of the filtered decoded reference block, and/or
- an amplitude/strength of the primary direction, and/or
- mean intensity information for the filtered decoded reference block, and/or
- average chrominance or luminance information for the filtered decoded reference block, and/or
- mean distortion information for the filtered decoded reference block,
- etc.

Depending on its type, the local characteristic may take one or more values.

In step 12, a set of encoding information to be used for encoding the current block and a method for encoding the current block are determined on the basis of the value of the local characteristic calculated in step 11.

In step 13, on the basis of the value of the local characteristic calculated in step 11, the current block is encoded on the basis of the determined set of encoding information and according to the determined encoding method.

Figure 2:
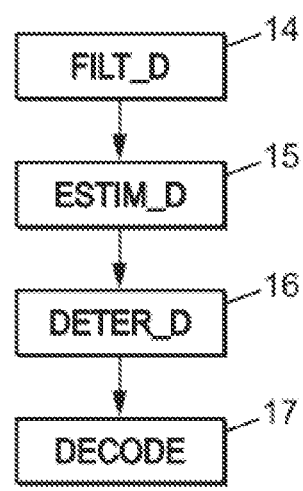
FIG. 2 is a diagram representing the main steps of a decoding method according to the invention.

FIG. 2 is a diagram representing the main steps of a decoding method according to the invention.

Images encoded in blocks according to the invention are initially received. The decoding method according to the invention is applied to an encoded current block of a first image relative to a reference block of a second image comprising at least one element in common with the first image. The reference block has been previously decoded.

In step 14, the decoded reference block is filtered using the same filter as the one used in the encoding. Thus, no information concerning the filter to be used is sent between the encoder and the decoder.

In step 15, at least one value of a local characteristic of the filtered decoded reference block is estimated by calculation. This step is identical to the estimation step 11 performed during encoding.

In step 16, a set of decoding information to be used for decoding the current block and a method for decoding the current block are determined on the basis of the value of the local characteristic calculated in step 15.

In step 16, on the basis of the value of the local characteristic calculated in step 15, the current block is decoded on the basis of the determined set of decoding information and according to the determined decoding method.

Figure 3:
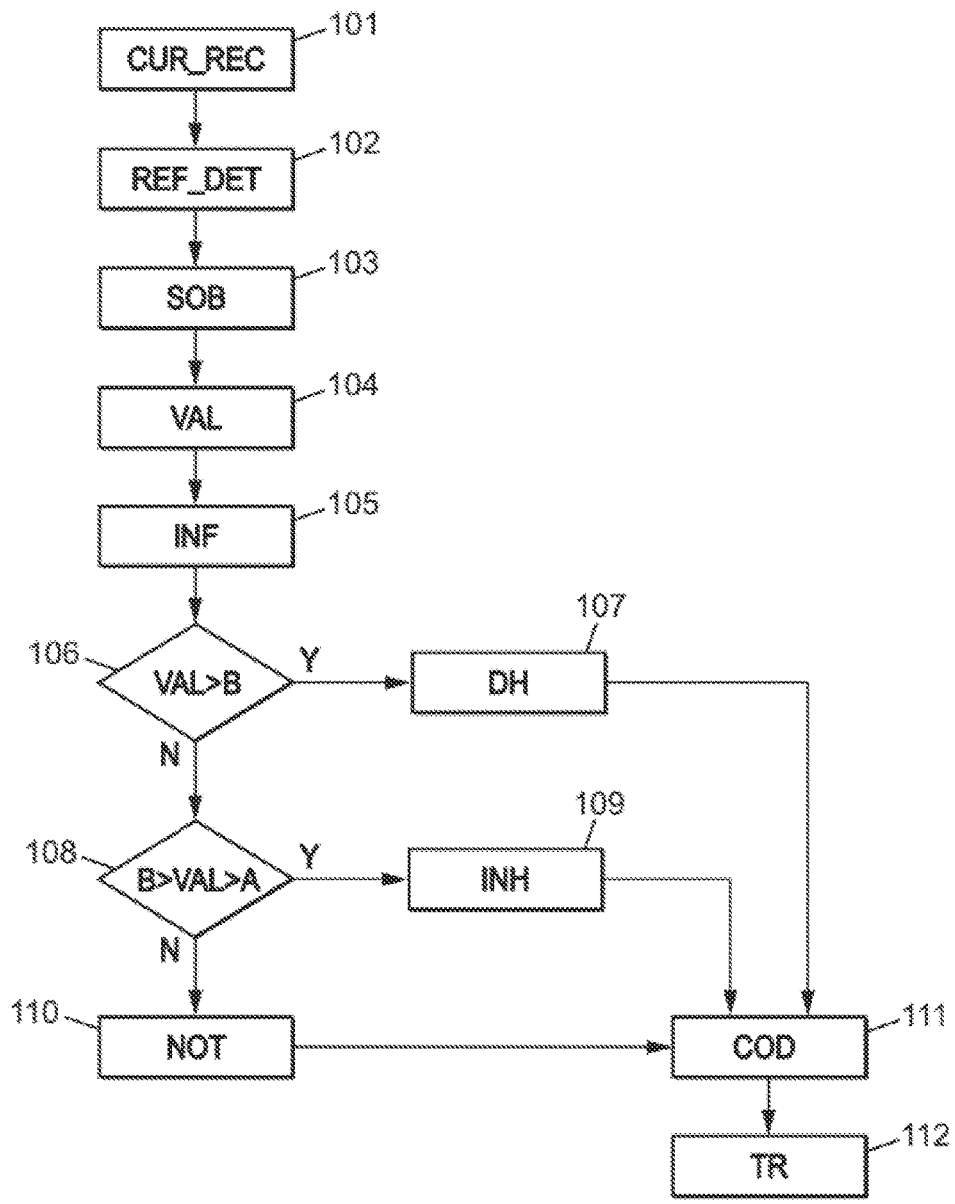
FIG. 3 is a diagram representing the detailed steps of the encoding method of FIG. 1, in one particular embodiment.

FIG. 3 is a diagram representing the detailed steps of the encoding method of FIG. 1, according to a particular embodiment of the invention.

The encoding method is preferably applied to images from at least one video sequence, for example video sequences which may contain images from different cameras with different views, video sequences of texture images and corresponding depth images, or a video sequence comprising temporally successive images (from the same camera). In the following description, the image coding is block-based.

In step 101, a current block of a first image is received by the encoder for encoding according to the invention.

In step 102, a reference block of a second image is determined relative to the current block. According to some embodiments of the invention:
- the first image and the second image can be a single image, and the reference block is then a neighboring block of the current block (Intra coding);
- the first image represents a given view from a first image acquisition device, such as a camera, and the second image represents a view adjacent to the given view, from a second camera. The current block and the reference block then respectively have identical positions in the first and second images when the position of the current block has been corrected by a disparity vector between the view of the first image and the view of the second image, as detailed below in reference to FIG. 6 (inter-view coding);
- the first image is captured after the capture of the second image, by the same camera, and the current block and the reference block then represent a common scene in the first image and second image respectively (Inter coding);
- the first image is a depth image captured by a depth camera and the second image is a texture image captured by a texture (color) camera, and the current block and the reference block have identical positions in the depth image and texture image respectively, as detailed below in reference to FIG. 5 (inter-component coding).

The reference block is a block which has been previously coded, still according to the invention. During step 102, the reference block is decoded so that the following steps applied during encoding are the same as the steps applied during decoding, as presented in reference to FIG. 2.

In step 103, a filter is applied to the decoded reference block. For example, such a filter performs edge detection in said reference block. Such a filter may be a Sobel filter, a Canny filter, or some other edge detection filter.

In step 104, at least one value of a local characteristic of the filtered decoded reference block is calculated solely on the basis of the decoded then filtered reference block. The value of the local characteristic is, for example, obtained by determining a maximum value of the luminance or chrominance gradient in the filtered decoded reference block, an average value of the luminance or chrominance gradient, a primary angle of the edge direction, or an index representing the mean absolute distortion (MAD), or any combination of the values described above.

In step 105, depending on the value of the local characteristic calculated in step 104, a set of encoding information to be used for encoding the current block is determined. The encoding information may relate to an encoding mode, one or more encoding parameters associated with the encoding mode, or both. "Encoding mode" is understood to mean an Intra encoding mode, an Inter encoding mode, a Skip encoding mode, the form of the partitioning of a macroblock, the type of transform (for example a DCT4×4 or DCT8×8 transform), motion information such as a motion vector or the precision of the motion vector resolution, etc. "Parameter associated with an encoding mode" is understood to mean any information serving as a parameter intrinsic to an encoding mode (for example values for deblocking filters or activation or deactivation thresholds for encoding tools, etc.).

In the following steps, a particular embodiment for determining an encoding method on the basis of the value of the local characteristic calculated in said step 104 will now be described.

In step 106, the value of the local characteristic calculated in step 104 is compared with a first threshold B. This first threshold is fixed and it is common to both the encoding and decoding. The same first threshold B may be used for all blocks to be coded. The value of the first threshold B is set differently depending on whether the value of the local characteristic is an average value, a maximum value, a MAD, or an angle.

If the value of the local characteristic is greater than the first threshold B, it is then inferred in step 107 that the correlation between the filtered decoded reference block and the current block is high. A direct inheritance encoding method is then selected for encoding the current block. To this end, the encoding information determined in step 105 is used as is to perform predictive encoding of the current block.

If the value of the local characteristic calculated in step 104 is less than the first threshold B, said value is compared in step 108 to a second threshold A. Again, this second threshold A is fixed and is common to both the encoding and decoding. The same second threshold A may be used for all blocks to be coded. The value of the second threshold A is set differently depending on whether the value of the local characteristic is an average value, a maximum value, a MAD, or an angle.

If the calculated value of the local characteristic is between the first threshold B and the second threshold A, the encoding information determined in step 105 is used for encoding the current block using an indirect inheritance method. For this purpose, said encoding information is added or substituted, in step 109, into a set of candidate predictors in order to compete in determining, according to a coding performance criterion (rate-distortion, for example), optimal encoding information. Thus, in the case where the set of encoding information comprises a given motion vector, the given motion vector can be added to the list of candidate motion vectors for the current block, for example to the list of AMVP candidates in a context of MVC coding as described above. To avoid changing the number of vectors in the list of competing candidates, the given motion vector can be substituted for a candidate in the list. Additionally or alternatively, when the encoding information determined in step 105 contains a particular coding mode, for example such as an Intra mode that is not already in the list of candidate Intra modes for coding the current block, for example such as a list of MPM candidates in a context of 3DVC coding as described above, the above step 109 may involve the addition (or substitution) of said particular Intra mode into the list of candidate Intra modes, for the purpose of determining an optimal Intra mode.

If the value of the local characteristic calculated in step 104 is less than the second threshold A, then an encoding method other than the direct and indirect inheritance methods is used in step 110 for encoding the current block, as the correlation between the current block and the filtered decoded reference block is considered to be too weak to use an inheritance coding method. The current block is for example encoded in a conventional manner, for example using a motion vector determined with respect to a block corresponding to the current block in a previously captured image. The use of conventional encoding, when the correlation between the filtered decoded reference block and the current block is weak, prevents the replacement of encoding information in a predetermined list of candidates by the encoding information determined in step 105, which would not be relevant in this case.

After step 107, 109 or 110, the current block is encoded in step 111 according to the determined encoding method and on the basis of the previously determined encoding information. The block encoded in this manner is transmitted in step 112, to a decoder for example. It should be noted that in the case of an indirect inheritance coding mode (after step 109), the optimal encoding information is transmitted in addition to the encoded current block to the decoder.

Figure 4:
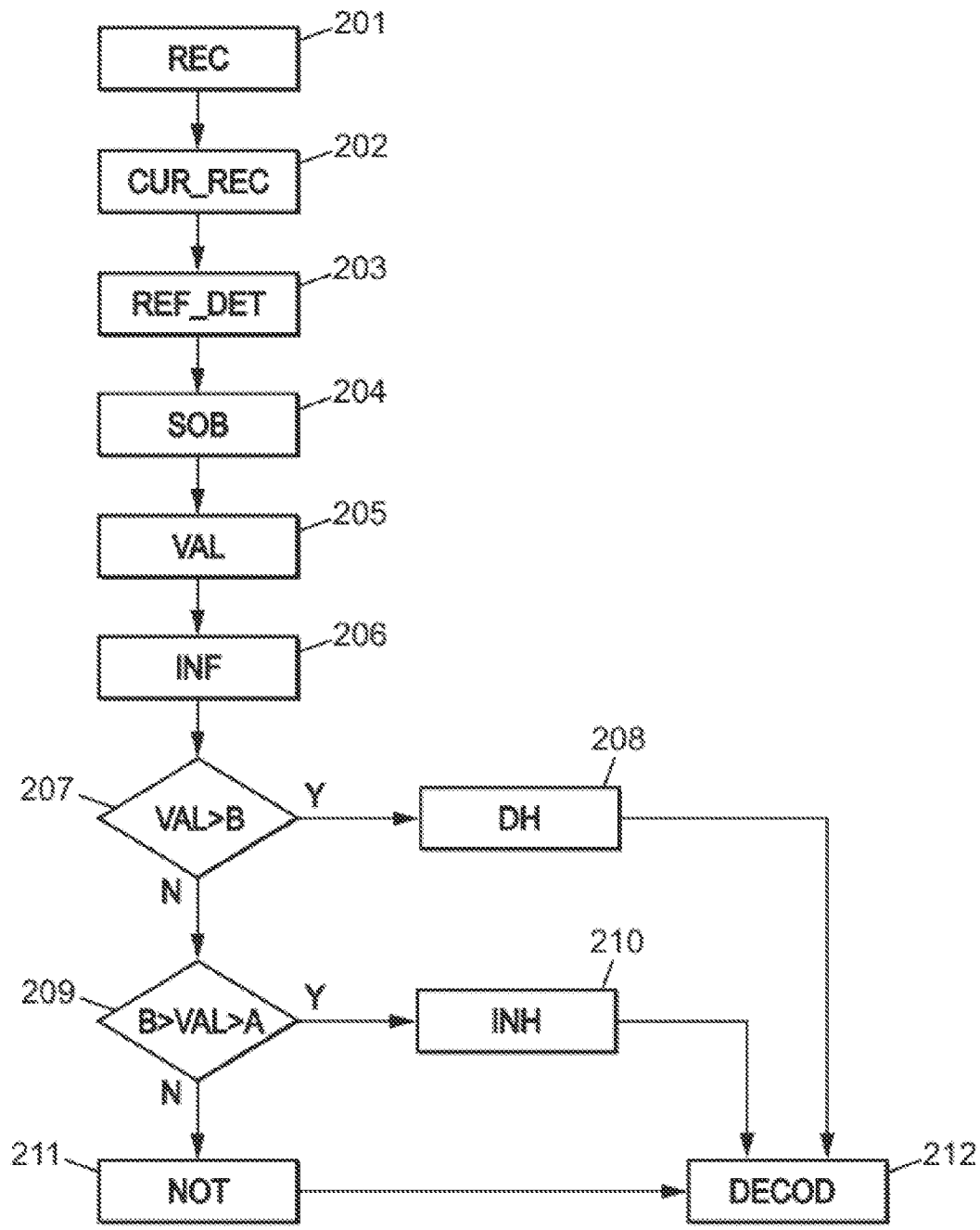
FIG. 4 is a diagram representing the detailed steps of the decoding method of FIG. 2, in one particular embodiment.

FIG. 4 is a diagram representing the detailed steps of the decoding method of FIG. 2, according to a particular embodiment of the invention.

In step 201, the blocks encoded according to the encoding method illustrated in FIG. 3 are received by a decoder for example. If some blocks were encoded according to an indirect inheritance method, the optimal encoding information is also received and read in step 201.

In step 202, the current block described above is received.

In step 203, the decoder determines the reference block to be used for decoding the current block. The same relationship between the reference block and the current block is used for both encoding and decoding (Intra coding, Inter coding, inter-view coding, or inter-component coding). The same reference block as the one used in the encoding is therefore selected. The reference block was previously received and decoded by the decoder. The decoded reference block used in the encoding is therefore the exact same one used in the decoding, without needing to send signaling bits between the encoder and the decoder to indicate the reference block to use.

In step 204, a filter is applied to the decoded reference block. This filter is the same filter as the one used in the encoding. Thus, no information about the filter to be used is sent between the encoder and the decoder.

In step 205, at least one value of the local characteristic of the filtered decoded reference block is calculated solely on the basis of the decoded then filtered reference block. The value of the local characteristic calculated during decoding is the same as the one calculated during encoding, as the same reference block is considered during decoding. The value of the local characteristic calculated during decoding is either the MAD, the primary angle, the maximum luminance or chrominance value of the filtered decoded reference block, or the average luminance or chrominance value of said block. The local characteristic of the filtered decoded reference block to be analyzed during encoding and decoding is fixed beforehand between the encoder and decoder, to ensure that no signaling bits for this local characteristic need to be sent between the encoder and decoder.

In step 206, depending on the value of the local characteristic calculated in step 205, a set of decoding information to be used for decoding the current block is determined. The decoding information may relate to a decoding mode, one or more decoding parameters associated with the decoding mode, or both. "Decoding mode" is understood to mean an Intra decoding mode, an Inter decoding mode, a Skip decoding mode, the form of the partitioning of a macroblock, the type of transform (for example a DCT4×4 or DCT8×8 transform), motion information such a motion vector or the precision of the motion vector resolution, etc. "Parameter associated with a decoding mode" is understood to mean any information serving as a parameter intrinsic to a decoding mode (for example values for deblocking filters or activation or deactivation thresholds for decoding tools, etc.).

A particular embodiment for determining a decoding method on the basis of the local characteristic calculated in step 205 will now be described in the following steps.

In step 207, the value of the local characteristic calculated in step 205 is compared with the first threshold B, the first threshold being common to both the encoding and decoding as previously explained.

If said calculated value is greater than the first threshold, then it is inferred in step 208 that the correlation between the decoded reference block and the current block is high. A direct inheritance decoding method is then selected for decoding the current block. To this end, the decoding information determined in step 206 from the value of the local characteristic calculated in step 205 is used as is to perform predictive decoding of the current block.

If the calculated value of the local characteristic is less than the first threshold B, said value is compared in step 209 to the second threshold A, the second threshold being common to both the encoding and decoding as previously explained.

If said calculated value is between the first threshold B and the second threshold A, the decoder having received and read the optimal encoding information with the encoded block in step 201, a direct inheritance decoding method is then chosen for the current block. The information among the decoding information determined in step 206 which corresponds to the optimal encoding information is then selected in step 210 as the optimal decoding information for decoding the current block.

If said calculated value is less than the second threshold A, then a decoding method other than the direct and indirect inheritance methods is used in step 211 for decoding the current block, as the correlation between the current block and the filtered decoded reference block is considered to be too weak. The current block is then decoded in a conventional manner.

After step 208, step 210, or step 211, the current block is decoded in step 212 on the basis of the decoding information determined in step 206. The current block decoded in this manner may then be used for further processing that is not part of the invention.

The invention therefore allows encoding and decoding by selective inheritance, meaning either encoding/decoding by direct inheritance, or encoding/decoding by indirect inheritance, or conventional encoding/decoding, on the basis of at least one value of a local characteristic of a filtered decoded reference block which is determined in the same manner in both the encoding and decoding. The stream of signaling bits between the encoder and decoder is thus reduced. In addition, the invention prevents the replacement of a predictor with a new predictor in a predetermined list of predictors, when this new predictor is not relevant (when the value of the local characteristic is below the second threshold). Another advantage of the invention is that it allows simultaneously considering methods for direct and indirect inheritance of encoding or decoding information, for encoding or decoding the same block.

Figure 5:
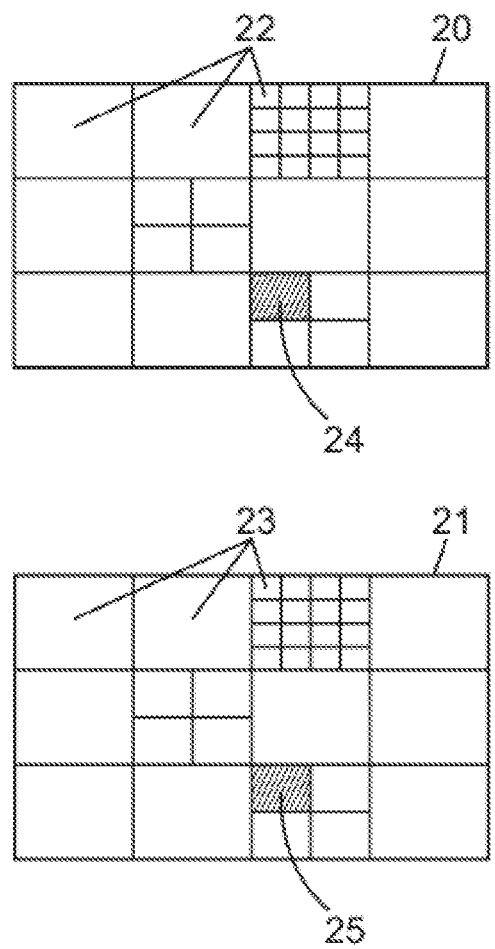
FIG. 5 illustrates a selective inheritance between a current block of a first image and a reference block of a second image in a particular embodiment of the invention.

FIG. 5 illustrates coding by selective inheritance, of a current block of a first image relative to a reference block of a second image, according to a particular embodiment of the invention.

In this particular embodiment:
the first image is a depth image 21 captured by a depth camera, this first image being the current picture to be coded,
the second image is a texture image 20 captured by a texture camera,
and the current block 25 in the depth image 21 has a position identical to that of a reference block 24 in the texture image 20.

The texture image 20 and depth image 21 represent the same view. In the example shown, they have identical partitioning structures. Thus, the texture image 20 comprises a set of blocks 22 and the depth image 21 comprises a corresponding set of blocks 23. However, the invention applies in the same manner when the partitioning structure of the texture image 20 is not the same as that of the depth image 21. For example, when the partitioning structures are different, a decoded reference block can be determined as being a block contained in the block corresponding to the current block, or alternatively the decoded reference block can contain the block corresponding to the current block.

The current block 25 and the reference block 24 thus occupy identical positions in the depth image 21 and in the texture image 20 respectively.

The reference block 24 is considered to have already been encoded, on the basis of Intra mode 1 for example. The reference block 24 is decoded for the encoding or decoding of the current block.

In the invention, the decoded reference block 24 is then filtered.

On the basis of at least one calculated value of a local characteristic of the filtered decoded reference block, one or more Intra coding modes can be determined as the encoding or decoding information. For this purpose, each range of values of the local characteristic may correspond to one or more specific Intra modes which may include, in one particular case, the Intra mode 1 that was used to code the reference block 24. For example, for a value of the local characteristic of between 1000 and 1500, the two Intra modes 2 and 9 are for example determined. For a value of a local characteristic of between 1500 and 4000, a single Intra mode, for example Intra mode 9, is determined. For the values of the local characteristic greater than 4000, a single Intra mode, for example Intra mode 7, is determined. In this example, the first threshold can be set at 4000 and the second threshold can be set at 1000. However, there are no restrictions on the choice of thresholds in the sense of the invention.

The ranges of values and the thresholds are given here by way of illustration and are dependent on the images concerned and on the local characteristic concerned for the filtered decoded reference block.

If the value of the local characteristic is above the first threshold, a direct inheritance coding mode is used. As the value of the local characteristic is then greater than 4000, Intra mode 7 (which corresponds to the range of values exceeding 4000) is inherited directly for coding the current block. If the value of the local characteristic is between the first threshold and second threshold, one or more Intra modes can be added (or substituted) to a list of candidate Intra modes for encoding and decoding the current block. Thus, if the value of the local characteristic is between 1000 and 1500, Intra modes 2 and 9 are added (or substituted) into the list of candidate Intra modes. If the value of the local characteristic is between 1500 and 4000, Intra Mode 9 is added (or substituted) into the list of Intra mode candidates. An optimal Intra mode can thus be determined by the encoder and then sent to the decoder for decoding the current block. The Intra mode(s) may for example be added to the MPM list in 3DVC coding. If the value of the local characteristic is below the second threshold, the Intra mode for coding the current block is then determined conventionally.

No restriction is placed on the number of value ranges considered for the purposes of the invention, and the foregoing examples are provided purely for illustrative purposes.

When Sobel filtering is applied to a decoded texture block as the decoded reference block, the maximum value of the gradient obtained by such filtering is a reliable indication of the width of the edges in said decoded texture block. If wide edges are detected, these edges are likely to be present in the corresponding depth image, and therefore the correlation between the best Intra modes for the decoded reference block and for the current block will be high since Intra modes are primarily directional. Thus, in some particular embodiments, the Intra mode determined for direct or indirect inheritance can be the Intra mode that was used for coding the reference block. In the case where the edges are less well-defined in the filtered decoded reference block, the correlation between the filtered decoded reference block and the current block is considered to be weaker and coding by indirect inheritance is more efficient than coding by direct inheritance.

Figure 6:
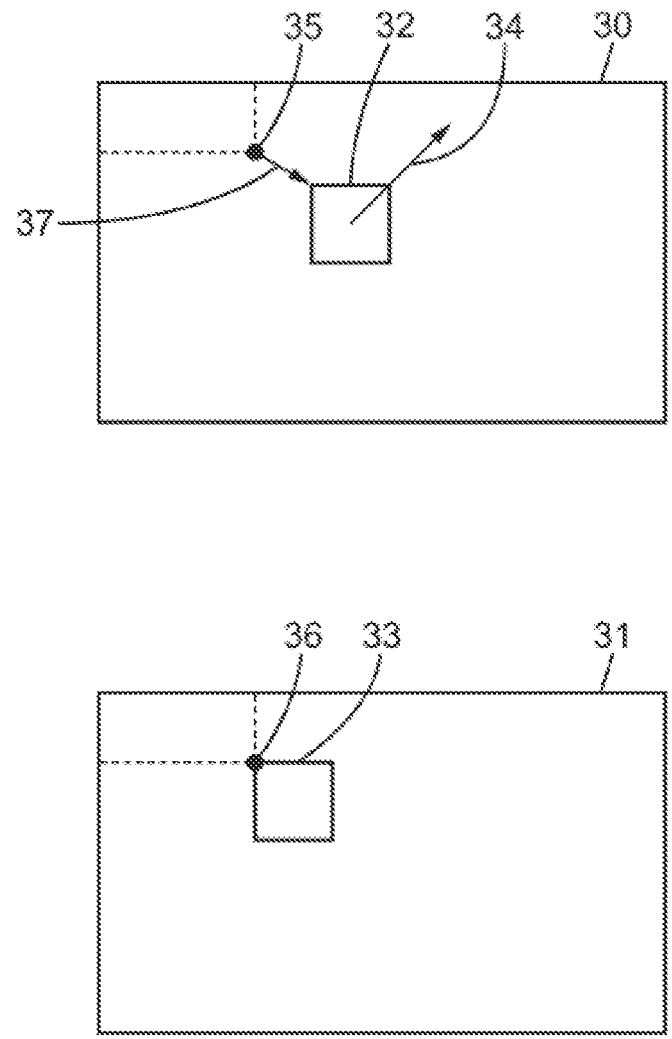
FIG. 6 illustrates a selective inheritance between a current block of a first image and a reference block of a second image in another particular embodiment of the invention.

FIG. 6 illustrates coding by selective inheritance, of a current block of a first image relative to a reference block of a second image, according to another particular embodiment of the invention.

In this other embodiment, the first image 31 represents a given view from a first image acquisition device, such as a camera, and the second image 30 represents a view adjacent to the given view, from a second camera.

A reference block 32 has been previously encoded using a motion vector 34. The reference block 32 is decoded, to allow encoding or decoding a current block 33 of the first image 31.

A disparity vector 37 is generated between the two views, so that the position of a current block in the first image 31 can be moved to match a decoded block in the second image 30 illustrating a common scene 30. This disparity vector 37 can be known from the respective positions of the first and second cameras and may for example be determined from depth images corresponding to the two views.

Thus, the upper left pixel of the decoded reference block 32 corresponds to a pixel 35 shifted by the disparity vector 37.

The current block 33 that is to be encoded in relation to the decoded reference block 32 is therefore positioned in the first image 31 so that the upper left pixel 36 of the current block corresponds to a position identical to the position of the upper left pixel 35 of the reference block 32 in the second image 30.

For the encoding or decoding of the current block 33, at least one value of a local characteristic of the decoded and filtered reference block 32 is determined for the reference block 32, as previously explained.

Again, on the basis of the calculated value of the local characteristic, one or more motion vectors are determined as the encoding or decoding information for the current block. Similarly to the embodiment described above, each range of values for the local characteristic may correspond to one or more particular motion vectors, which in one particular example may include the motion vector 34 used to encode/decode the reference block 32. For example, for a value of the local characteristic of between 1000 and 1500, two motion vectors that are different from motion vector 34 are determined. For a value of the local characteristic of between 1500 and 4000, another motion vector that is again different from motion vector 34 as well as from said two motion vectors is determined. For values of the local characteristic that are greater than 4000, yet another different motion vector is determined. In this example, the first threshold can be set at 4000 and the second threshold can be set at 1000. However, there are no restrictions on the choice of thresholds in the sense of the invention.

If the value of the local characteristic is above the first threshold, then the motion vector to be used for encoding or decoding the current block is directly inherited from the motion vector which was determined within the range of values greater than 4000. If the value of the local characteristic is between the first threshold and the second threshold, the motion vector which was determined within the range of values bounded by the first and second thresholds is added to the list of AMVP candidates for the current block in a context of MVC encoding or decoding.

The motion vector fields of two adjacent views are highly correlated, particularly the edges. Thus, the maximum value of the gradient obtained from Sobel filtering (or any other edge detection filter) on the decoded reference block 32 is a good estimate of the correlation existing between the decoded reference block 32 and the current block 33. Additionally or alternatively, the motion vector which was used to encode/decode the reference block 32 may thus also be used as the motion vector (encoding or decoding information) of the current block, in the case of encoding/decoding by direct or indirect inheritance.

Figure 7:
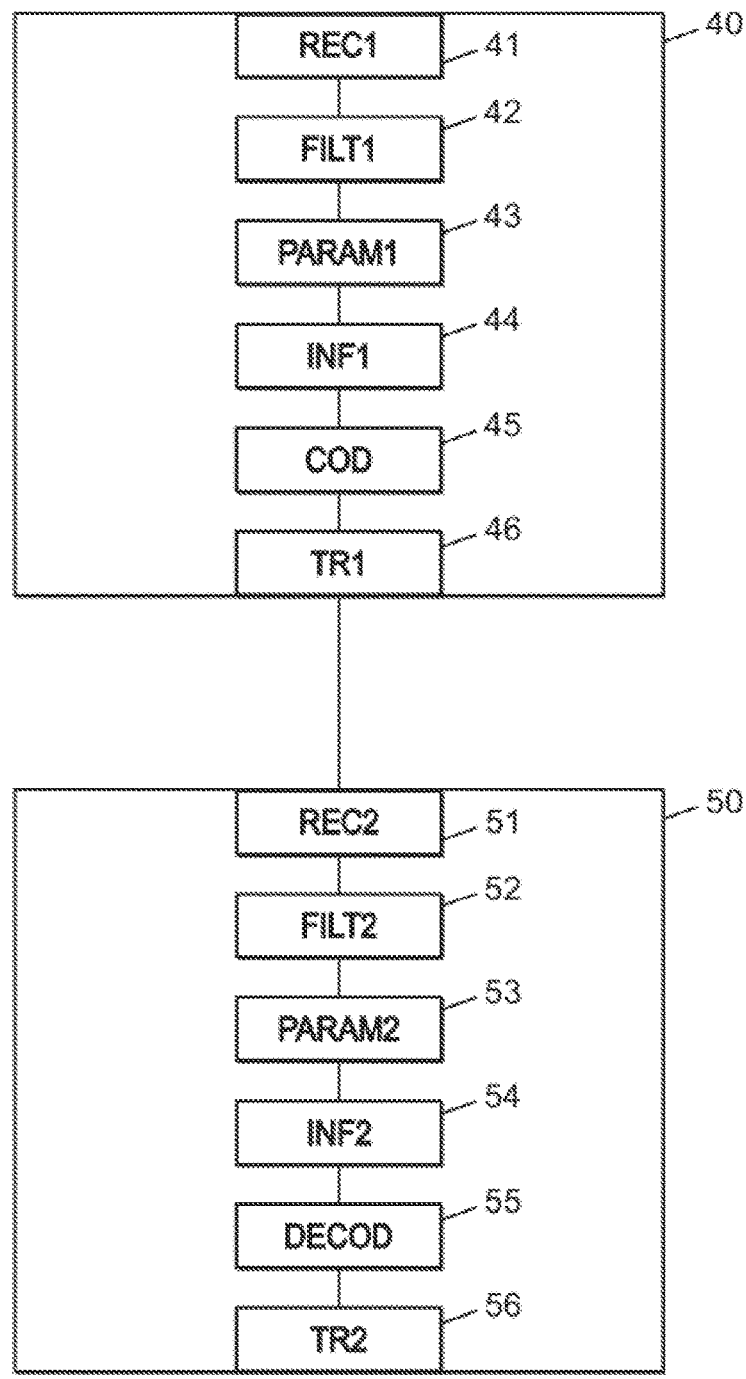
FIG. 7 illustrates a system comprising an encoder and a decoder according to some embodiments.

FIG. 7 illustrates a system comprising an encoder 40 and a decoder 50 according to a particular embodiment of the invention.

The encoder 40 comprises a receiving unit 41 suitable for receiving images from one or more video sequences, to be used in block-based image coding. Said receiving unit thus receives a current block to be encoded according to the invention.

The encoder also comprises a unit 42 for filtering a reference block that was previously encoded and then decoded. Said reference block is to be used to encode the current block. The filtering unit 42 is for example an edge detection filter as mentioned above in the description.

The filtering unit 42 is able to transmit the filtered decoded reference block to an estimation unit 43 able to estimate at least one value of a local characteristic of said filtered decoded reference block.

From the estimated value of the local characteristic, a determination unit 44 determines a set of encoding information for the current block, as well as a method for encoding for said current block. As previously explained, the determination unit 44 thus determines:

a set of encoding information which may be one or more encoding modes and/or one or more encoding parameters associated with one of these modes, and an encoding method which is either a direct inheritance encoding method, or an indirect inheritance encoding method, or a conventional encoding method.

An encoding unit 45 encodes the current block on the basis of the determined set of encoding information and the determined encoding method.

A transmission unit 46 transmits the encoded current block to the decoder 50. When a direct inheritance encoding method has been used, the determined optimal encoding information is also sent to the decoder unit 50 by the transmission unit 46. No restriction is placed on the means of communication used between the encoder 40 and the decoder 50 in the invention.

In a corresponding manner, the decoder 50 comprises a receiving unit 51 suitable for receiving the encoded images in block form (and possibly the optimal encoding information if the blocks were encoded by an indirect inheritance method). The receiving unit 51 receives the current block which has been encoded by the encoder 40.

The decoder 50 also comprises a filtering unit 52 for filtering a reference block that was previously encoded and then decoded, which is to be used to decode the current block. Said reference block is the same reference block used to encode the current block. The filtering unit 52 is, for example, an edge detection filter as mentioned above in the description.

The filtering unit 52 transmits the filtered decoded reference block to an estimation unit 53 that is able to estimate at least one value of a local characteristic of said filtered decoded reference block.

From the estimated value of the local characteristic, a determination unit 54 is able to derive a set of decoding information for the current block as well as a method for decoding the current block. As previously explained, the determination unit 54 thus determines:

a set of decoding information which may be one or more decoding modes and/or one or more parameters associated with one of these modes, and a decoding method which is either a direct inheritance decoding method, or an indirect inheritance decoding method, or a conventional decoding method.

A decoding unit 55 is then able to decode the current block on the basis of the determined set of decoding information and the determined decoding method.

A transmission unit 56 transmits the decoded current block to processing devices for the decoded current block; said devices are not part of the invention.

The invention can thus be implemented within the encoding/decoding and the standards presented in the introductory part of the present application.

Non-limiting examples are provided here for illustrative purposes only.

For MVC coding, the maximum gradient value of the decoded then filtered reference block can be used as the value of the local characteristic, to determine whether a current block should inherit the motion vector of the reference block or whether the motion vector of the reference block should be added to the list of AMVP candidates for prediction.

For 3DVC coding, the maximum gradient value of the decoded then filtered texture reference block can be used as the value of the local characteristic, to determine whether the Intra mode of a depth image should inherit the Intra mode of the texture image or whether the Intra mode of the texture image should be added to the list of MPM candidates for predicting the Intra mode of the depth image.

Alternatively, for 3DVC coding, the maximum gradient value of the decoded then filtered texture reference block can be used as the value of the local characteristic, to determine whether a partitioning structure of a depth block should directly inherit the partitioning structure of the texture block, without providing prediction. Thus, the present invention can also be applied in cases where the second threshold has a zero value. Only one comparison is then made with the first threshold in order to determine whether direct inheritance is to be applied.

The invention claimed is:

1. A method comprising the following acts performed by an encoding device:

encoding at least one current block of a first image relative to a decoded reference block of a second image comprising at least one element in common with said first image, said reference block having been previously been encoded then decoded, wherein encoding comprises:

filtering using image processing to produce a filtered decoded reference block;

estimating, solely on the basis of said filtered decoded reference block, at least one value of a local characteristic of the filtered decoded reference block;

determining, only on the basis of the estimated value of the local characteristic:

a set of encoding information to be used for encoding the current block, a particular method for encoding the current block, encoding the current block on the basis of said set of encoding information and according to said particular method of encoding, transmitting the encoded current block to a decoding device without transmitting to the decoding device signaling data indicating the particular method of encoding determined only on the basis of the estimated value of the local characteristic.

2. A method comprising the following acts performed by a decoding device:

decoding at least one encoded current block of a first image relative to a decoded reference block of a second image comprising at least one element in common with said first image, said reference block having previously been decoded, wherein decoding comprises:

receiving the encoded current block from an encoding device without receiving signaling data indicating a determined encoding method;

filtering using image processing to produce the filtered decoded reference block;

estimating, solely on the basis of said filtered decoded reference block, at least one value of a local characteristic of the filtered decoded reference block;

determining, only on the basis of the estimated value of the local characteristic:

a set of decoding information to be used for decoding the current block, a particular method for decoding the current block, decoding the current block on the basis of said set of decoding information and according to said particular method of decoding determined only on the basis of the estimated value of the local characteristic.

3. The method according to claim 1, wherein the encoding of the current block according to said determined encoding method is:
   direct, where the encoding information of said determined set is used as is to predict the current block,
   indirect, where during encoding, the encoding information of said determined set competes with predetermined encoding information on the basis of a coding performance criterion, to select the optimal encoding information to be used to predict the current block.

4. The method according to claim 1, wherein a first threshold and a second threshold are predetermined, said first threshold being greater than the second threshold, and wherein:
   if the estimated value of the local characteristic is higher than the first threshold, said method for direct encoding is used;
   if the estimated value of the local characteristic is between the first threshold and the second threshold, said method for indirect encoding is used;
   otherwise, a method for encoding other than said direct and indirect methods is used.

5. The method according to claim 1, wherein:
   said encoding information includes at least one encoding mode, or at least one encoding parameter associated with said encoding mode, or both.

6. The method according to claim 1, for images initially captured by a plurality of image acquisition devices, wherein, each image representing a given view, the first image corresponds to a view adjacent to the second image, and wherein the current block and the reference block have identical positions in the first image and the second image respectively, when the position of the current block is corrected by a disparity vector between the view of the first image and the view of the second image.

7. The method according to claim 1, for temporally successive images captured by an image acquisition device, wherein the first image corresponds to an image captured after the capture of the second image, and wherein the current block and the reference block represent a common scene in the first and second images respectively.

8. The method according to claim 1, for texture images captured in association with depth images, wherein the first image is a depth image and the second image is the texture image associated with the first image, and wherein the current block and the reference block have identical positions in the first image and second image respectively.

9. A non-transitory computer-readable medium comprising a computer program stored thereon and comprising instructions for implementing a method of encoding when the program is executed by a processor, wherein the method comprises the following acts performed by an encoding device:
   encoding at least one current block of a first image relative to a decoded reference block of a second image comprising at least one element in common with said first image, said reference block having been previously been encoded then decoded, wherein encoding comprises:
      filtering using image processing to produce a filtered decoded reference block;
      estimating, solely on the basis of said filtered decoded reference block, at least one value of a local characteristic of the filtered decoded reference block;
      determining, only on the basis of the estimated value of the local characteristic:
         a set of encoding information to be used for encoding the current block,
         a particular method for encoding the current block,
      encoding the current block on the basis of said set of encoding information and according to said particular method of encoding,
      transmitting the encoded current block to a decoding device without transmitting to the decoding device signaling data indicating the particular method of encoding determined only on the basis of the estimated value of the local characteristic.

10. An apparatus comprising:
   an encoder configured to encode at least one current block of a first image relative to a reference block of a second image comprising at least one element in common with said first image, said reference block having been previously encoded and then decoded, wherein the encoder comprises:
      a unit configured to filter using image processing to produce a filtered decoded reference block,
      a unit configured to estimate, solely on the basis of said filtered decoded reference block, at least one value of a local characteristic of the filtered decoded reference block;
      a unit configured to determine, only on the basis of said estimated value of a local characteristic:
         a set of encoding information to be used for encoding the current block,
         a particular method for encoding the current block; and
      an encoding unit which is configured to encode the current block on the basis of said set of encoding information and according to said particular method of encoding,
      a unit configured to transmit the encoded current block to a decoding device without transmitting to the decoding device signaling data indicating the particular method of encoding determined only on the basis of the estimated value of the local characteristic.

11. A decoder for decoding at least one encoded current block of a first image relative to a reference block of a second image comprising at least one element in common with said first image, said reference block having previously been decoded, wherein the decoder comprises:
   a unit configured to receive the encoded current block from an encoding device without receiving signaling data indicating a determined encoding method,
   a unit configured to filter using image processing to produce a filtered decoded reference block,
   a unit configured to estimate, solely on the basis of said filtered decoded reference block, at least one value of a local characteristic of the filtered decoded reference block;
   a unit configured to determine, only on the basis of the estimated value of the local characteristic:
      a set of decoding information to be used for decoding the current block,
      a particular method for decoding the current block; and
   a decoding unit which is configured to decode the current block on the basis of said set of decoding information and according to said particular method for decoding determined only on the basis of the estimated value of the local characteristic.

12. The apparatus according to claim 10, further comprising:
a decoder, said decoder comprising :
a unit configured to filter the decoded reference block,
a unit configured to estimate, solely on the basis of said filtered decoded reference block, at least one value of a local characteristic of the filtered decoded reference block;
a unit configured to determine, on the basis of the estimated value of the local characteristic:
a set of decoding information to be used for decoding the current block,
a method for decoding the current block; and
a decoding unit which is configured to decode, on the basis of the estimated value of the local characteristic, the current block on the basis of said determined set of decoding information and according to said determined decoding method,
the apparatus further comprising a transmission unit configured to transmit coded blocks to the encoder for block based image coding.

13. The method according to claim 2, wherein the decoding of the current block according to said determined decoding method is:
direct, where the decoding information of said determined set is used as is to predict the current block,
indirect, where during encoding, the encoding information of said determined set competes with predetermined encoding information on the basis of a coding performance criterion, to select the optimal encoding information to be used to predict the current block, and where during decoding, the optimal encoding information is read so as to select the corresponding decoding information in said determined set of decoding information in order to predict the current block.

14. The method according to claim 2, wherein a first threshold and a second threshold are predetermined, said first threshold being greater than the second threshold, and wherein:
if the estimated value of the local characteristic is higher than the first threshold, said method for direct decoding is used;
if the estimated value of the local characteristic is between the first threshold and the second threshold, said method for indirect decoding is used;
otherwise, a method for decoding other than said direct and indirect methods is used.

15. The method according to claim 2, wherein:
said decoding information includes at least one decoding mode, or at least one decoding parameter associated with said decoding mode, or both.

16. The method according to claim 2, for images initially captured by a plurality of image acquisition devices, wherein, each image representing a given view, the first image corresponds to a view adjacent to the second image, and wherein the current block and the reference block have identical positions in the first image and the second image respectively, when the position of the current block is corrected by a disparity vector between the view of the first image and the view of the second image.

17. The method according to claim 2, for temporally successive images captured by an image acquisition device, wherein the first image corresponds to an image captured after the capture of the second image, and wherein the current block and the reference block represent a common scene in the first and second images respectively.

18. The method according to claim 2, for texture images captured in association with depth images, wherein the first image is a depth image and the second image is the texture image associated with the first image, and wherein the current block and the reference block have identical positions in the first image and second image respectively.

19. A non-transitory computer-readable medium comprising a computer program stored thereon and comprising instructions for implementing a method of decoding when the program is executed by a processor, wherein the method comprises the following acts performed by an decoding device:
decoding at least one encoded current block of a first image relative to a decoded reference block of a second image comprising at least one element in common with said first image, said reference block having previously been decoded, wherein decoding comprises:
receiving the encoded current block from an encoding device without receiving signaling data indicating a determined encoding method;
filtering using image processing to produce a filtered decoded reference block;
estimating, solely on the basis of said filtered decoded reference block, at least one value of a local characteristic of the filtered decoded reference block;
determining, only on the basis of the estimated value of the local characteristic:
a set of decoding information to be used for decoding the current block,
a particular method for decoding the current block,
decoding the current block on the basis of said set of decoding information and according to said particular method of decoding determined only on the basis of the estimated value of the local characteristic.

* * * * *